United States Patent
Suzuki

(10) Patent No.: US 8,390,841 B2
(45) Date of Patent: Mar. 5, 2013

(54) ISSUING A WARNING WHEN A USER ATTEMPTS TO USE A DEVICE THAT IS ALREADY BEING USED

(75) Inventor: Nobuhiko Suzuki, Nagoya (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 1078 days.

(21) Appl. No.: 11/736,610

(22) Filed: Apr. 18, 2007

(65) Prior Publication Data
US 2008/0018957 A1 Jan. 24, 2008

(30) Foreign Application Priority Data

Apr. 28, 2006 (JP) .................................. 2006-126565

(51) Int. Cl.
*G06F 3/12* (2006.01)
(52) U.S. Cl. ...................................................... 358/1.15
(58) Field of Classification Search .................. 358/1.15
See application file for complete search history.

(56) References Cited

U.S. PATENT DOCUMENTS

| | | | | |
|---|---|---|---|---|
| 5,500,725 | A * | 3/1996 | Takasu et al. | 399/17 |
| 6,226,096 | B1 * | 5/2001 | Ouchi | 358/1.14 |
| 6,434,643 | B1 * | 8/2002 | Ejiri | 710/58 |
| 6,701,095 | B1 | 3/2004 | Fujimoto et al. | |
| 6,934,058 | B2 * | 8/2005 | Kageyama et al. | 358/497 |
| 6,950,613 | B2 | 9/2005 | Fujimoto et al. | |
| 6,970,272 | B2 * | 11/2005 | Nanno | 358/1.9 |
| 7,146,111 | B2 | 12/2006 | Fujimoto et al. | |
| 7,624,148 | B2 * | 11/2009 | van Dalen | 709/206 |
| 2003/0218767 | A1 * | 11/2003 | Schroath et al. | 358/1.14 |
| 2005/0219607 | A1 * | 10/2005 | Yamaguchi et al. | 358/1.15 |
| 2006/0215218 | A1 * | 9/2006 | Ujigawa | 358/1.15 |

FOREIGN PATENT DOCUMENTS

| | | |
|---|---|---|
| JP | 5-183671 A | 7/1993 |
| JP | 5-333988 | 12/1993 |
| JP | 11-261750 A | 9/1999 |
| JP | 2000-201245 A | 7/2000 |
| JP | 2001-189827 A | 7/2001 |
| JP | 2002-033859 | 1/2002 |
| JP | 2003-060829 A | 2/2003 |
| JP | 2003-250019 A | 9/2003 |
| JP | 2003-298810 A | 10/2003 |
| JP | 2003-344957 | * 12/2003 |
| JP | 2004-193935 A | 7/2004 |
| JP | 2004-215009 | 7/2004 |
| JP | 2005-045426 | 2/2005 |
| JP | 2006-033675 A | 2/2006 |
| JP | 2006-060617 A | 3/2006 |
| JP | 2006-086642 A | 3/2006 |

OTHER PUBLICATIONS

JP Office Action dtd May 20, 2008, JP Appln. 2006-126565.

* cited by examiner

*Primary Examiner* — Benny Q Tieu
*Assistant Examiner* — Eric A Rust
(74) *Attorney, Agent, or Firm* — Banner & Witcoff, Ltd.

(57) ABSTRACT

An original reading apparatus, according to the present invention can include a reading portion capable of acquiring image data by reading an original, a communication portion that is connected to an external terminal device, a console capable of enabling an input operation by a user, a scan control portion that, based on a read command that is received through the communication portion from the terminal device, is capable of executing communication scan processing that sends image data that is acquired by the reading portion to the terminal device through the communication portion, and a warning portion capable of issuing a warning when an input operation is performed at the console when executing the communication scan processing.

21 Claims, 11 Drawing Sheets

ISSUING A WARNING WHEN A USER ATTEMPTS TO USE A DEVICE THAT IS ALREADY BEING USED

CROSS REFERENCE TO RELATED APPLICATION

This application claims priority from Japanese Patent Application No. 2006-126565 filed Apr. 28, 2006. The entire content of this priority application is incorporated herein by reference.

TECHNICAL FIELD

This disclosure relates to an original reading apparatus, an image forming apparatus and an original reading system.

BACKGROUND

Technology has already been proposed in which a reading operation of a scanner apparatus (original reading apparatus), on which an original is set, is executed upon receipt of a read command from a terminal device on a network, and the image data acquired by the reading operation is then supplied to the terminal device. This kind of network scan offers the advantage that it is possible to set reading conditions and the like in detail at the terminal device at the time of a reading operation. On the other hand, however, since there are many cases in which the scanner apparatus and the terminal device are located at separate locations, there is a risk that if a read command is sent from a terminal device by another user while a user who has set an original on the scanner apparatus is away from the scanner apparatus, the image data will be sent in error to the terminal device of the wrong user.

As a countermeasure for this kind of problem, for example, Japanese Patent Laid-Open No. 2002-33859 discloses a scanner apparatus that is configured such that the user is made to input an ID when setting an original on the scanner apparatus. Thereafter, when that ID matches an ID that is sent from a terminal device the scanner apparatus accepts and executes the read command from the terminal device. It is thereby possible to prevent a situation in which image data is sent in error to the wrong terminal device due to an operation by another user at a terminal device.

However, even with an apparatus as described above, it is possible that an operation that directly obstructs a network scan may be performed by another user at the scanner apparatus. More specifically, in a case where another user removes originals that have been set in the automatic document feeder (ADF), opens the original cover, or presses a button such as a stop key, appropriate countermeasures can not be taken by the user to stop such an obstruction.

In view of this situation, there is a need for technology that enables a user to take appropriate action in a case in which an operation that obstructs a network scan is directly performed with respect to an original reading apparatus, an image forming apparatus or an original reading system.

SUMMARY

An original reading apparatus, according to the present invention can include a reading portion capable of acquiring image data by reading an original, a communication portion that is connected to an external terminal device, a console capable of enabling an input operation by a user, a scan control portion that, based on a read command that is received through the communication portion from the terminal device, is capable of executing communication scan processing that sends image data that is acquired by the reading portion to the terminal device through the communication portion, and a warning portion capable of issuing a warning when an input operation is performed at the console when executing the communication scan processing.

BRIEF DESCRIPTION OF THE DRAWINGS

Illustrative aspects in accordance with the invention will be described in detail with reference to the following figures wherein.

DETAILED DESCRIPTION OF THE PREFERRED ILLUSTRATIVE ASPECTS

Figure 1:
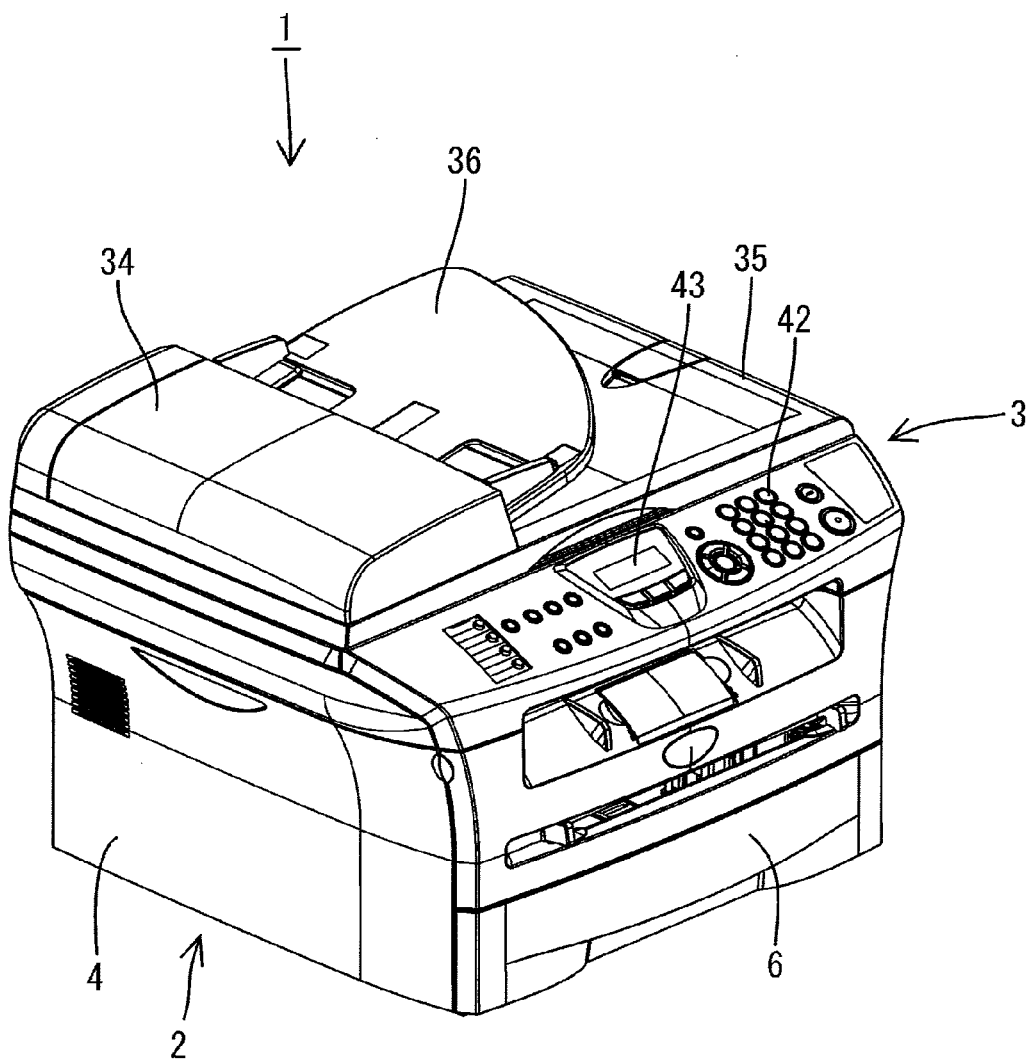
FIG. 1 is an oblique perspective view showing the outer appearance of a multifunction apparatus according to one illustrative aspect of the present invention.
Figure 2:
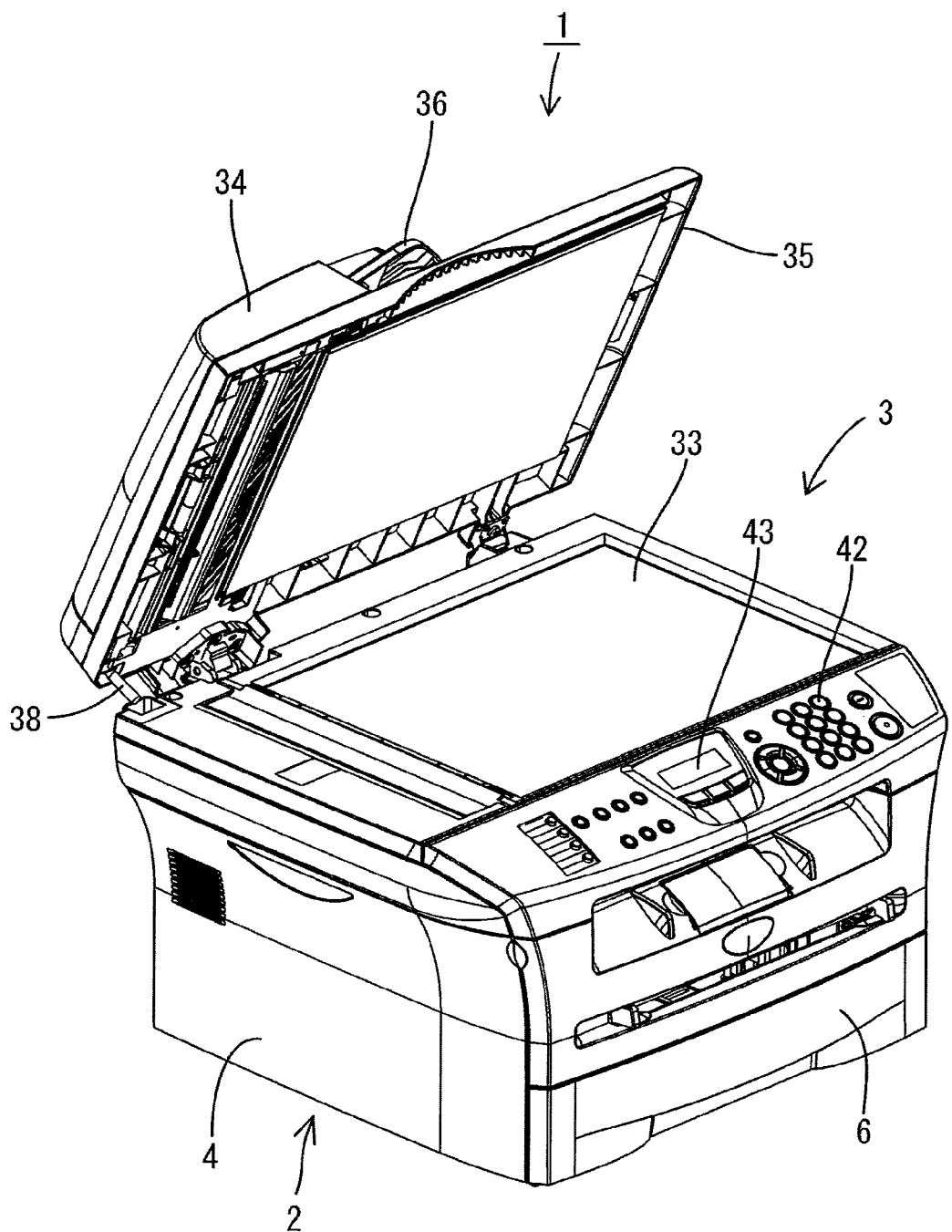
FIG. 2 is an oblique perspective view of the multifunction apparatus that shows a state in which an original cover is raised.

An illustrative aspect according to the present invention will be described with reference to FIG. 1 to FIG. 11.
1. Total Structure FIG. 1 is an oblique perspective view showing the outer appearance of a multifunction device 1 as one example of an image processing apparatus and image forming apparatus according to the present invention, and FIG. 2 is an oblique perspective view of the multifunction device 1 that shows a state in which an original cover 35 is raised. This multifunction device 1 is a multifunction peripheral apparatus that is equipped with various functions such as a printer function, a scanner function and a copy function. The multifunction device 1 comprises a main body portion 2 that houses an image forming portion 10 that forms an image on a recording medium 5 (such as a paper sheet, plastic sheet, or the like), and an original reading portion 3 that is provided on top of the main body portion 2 and reads an original image.
(Main Body Portion)

Figure 3:
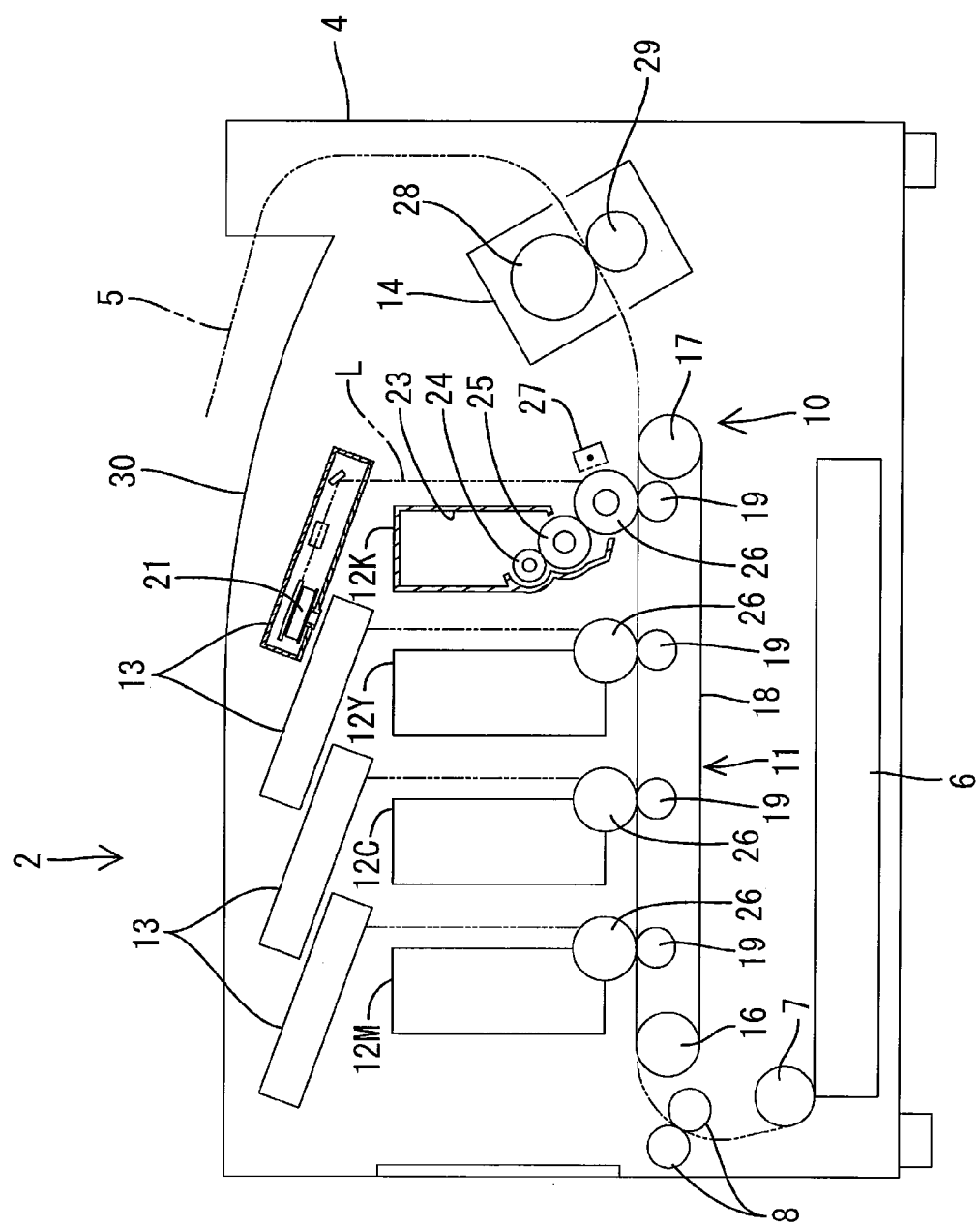
FIG. 3 is a cross section showing a schematic configuration of a main body portion.

FIG. 3 is a cross section showing a schematic configuration of the main body portion 2. In the description below, the left side in this figure is taken to be the front.

The main body portion 2 comprises a substantially box-shaped main body casing 4, and a sheet feeding tray 6 (in which a plurality of sheets of the recording medium 5 for forming an image are stacked) is provided at the inside bottom of this main body casing 4 in a condition in which the sheet feeding tray 6 can be pulled out towards the front side.

A supply roller 7 is provided at an upper region at the front end of the sheet feeding tray 6. By rotation of this supply roller 7, a recording medium 5 that is stacked at the uppermost position inside the sheet feeding tray 6 can be delivered to registration rollers 8 that are provided above the supply roller 7. At the registration rollers 8, the recording medium 5 is delivered onto the top of a backward belt unit 11.

The image forming portion 10 (one example of "printing portion") is provided above the sheet feeding tray 6 inside the main body casing 4. The image forming portion 10 comprises the belt unit 11, process units 12M, 12C, 12Y and 12K, exposing portions 13 and a fixing device 14.

In the belt unit 11, a conveying belt 18 is provided in a horizontally suspended condition between a pair of supporting rollers 16 and 17 at the front and rear thereof, and by rotational driving of the supporting roller 17 that is disposed at the rear side, the conveying belt 18 moves in a circulating manner such that the recording medium 5 (that was placed on the top surface thereof) is conveyed rearward. On the inner side of the conveying belt 18, transfer rollers 19 that are disposed facing respective photosensitive drums 26 of the process units 12, described later, are provided in a condition in which they are aligned in the front-to-rear direction.

Each of the exposing portions 13 emits a laser beam L that corresponds to one color of image data from a light source, and irradiates the laser beam L by high-speed scanning onto the surface of the respective photosensitive drums 26 via a mirror (i.e. of the polygon type or the like) that is rotationally driven by a motor 21.

The process units 12M, 12C, 12Y and 12K respectively comprise a toner containing chamber 23 that can contain toner of the colors magenta (M), cyan (C), yellow (Y), black (K) or the like, a supply roller 24, a developing roller 25, a photosensitive drum 26, a charging device 27 (for example, a scorotron charging device) and the like.

Toner that is discharged from the toner containing chamber 23 is supplied to the developing roller 25 by rotation of the supply roller 24, and at that time, the area between the supply roller 24 and the developing roller 25 is triboelectrically charged positively. Accompanying that rotation, the surface of the photosensitive drum 26 is uniformly charged to a positive charge by the charging device 27, and thereafter, the surface is exposed by the laser beam L from the exposing portion 13 to thereby form an electrostatic latent image thereon that corresponds to the image to be formed on the recording medium 5. Next, when the toner that is carried on the surface of the developing roller 25 is supplied to the surface of the photosensitive drum 26 (by the rotation of the developing roller 25), the electrostatic latent image is visualized. Thereafter, the toner image that is carried on the surface of the photosensitive drum 26 is transferred to the recording medium 5 by a transfer bias voltage applied to a transfer roller 19 while the recording medium 5 passes between the photosensitive drum 26 and the transfer roller 19.

The fixing device 14 comprises a heat roller 28 that has a heat source, and a pressure roller 29 that presses the recording medium 5 to the heat roller 28 side. The fixing device 14 subjects the toner image that was transferred onto the recording medium 5 to heat fixing to the sheet surface. The recording medium 5 on which a toner image was heatedly fixed by the fixing device 14 is then conveyed upward to be discharged onto a discharge tray 30 that is provided on the top surface of the main body casing 4.

(Original Reading Portion)

As shown in FIG. 1 and FIG. 2, an original reading portion 3 (one example of "reading portion") is equipped with an original placement portion 33 that comprises a rectangular, transparent glass plate. An original is placed on this original placement portion 33 when reading an original by a so-called "flatbed" (FB) method. The upper part of the original placement portion 33 is covered by an original cover 35 provided with an ADF 34 (one example of "original conveying mechanism") in a condition in which the original cover 35 can open and close. The configuration adopted is such that the original cover 35 is capable of being closed so that an original that is placed on the original placement portion 33 is sandwiched between the original cover 35 and the original placement portion 33. At one corner portion on the lower surface of the original cover 35 is provided a cover opening and closing sensor 38 (one example of "open/closed detection portion") for detecting an open and closed state.

The ADF 34 is equipped with an original tray 36 in which a plurality of originals can be stacked. The original tray 36 is provided with an original sensor 39 (one example of "original detection portion"; see FIG. 4) that can utilize a photosensor or the like for detecting whether or not an original is stacked thereon. The ADF 34 conveys, one by one, originals that are stacked on the original tray 36, and discharges each original after that original is read by a CCD image sensor 40 that is described next.

The CCD image sensor 40 (see FIG. 4) is provided below the original placement portion 33. The CCD image sensor 40 comprises photodiodes that can be disposed in a row in the front to rear direction. When a strong light is shone on an original by a light source, the light is reflected and is received by the individual photodiodes. The photodiodes then convert the light intensity (brightness) of the reflected light for each pixel of the original into an electrical signal. At the original reading portion 3, these electrical signals are converted into digital data by an A/D converter (not shown), to thereby read the image that is on the original as image data.

Reading of an original may be performed by placing the original on the original placement portion 33 (FB reading) or by utilizing the ADF 34 (ADF reading). In the case of FB reading, the CCD image sensor 40 moves in a left to right direction along the plate surface of the original placement portion 33, and at that time reading of the original on the original placement portion 33 is performed one line at a time. In the case of ADF reading, the CCD image sensor 40 is fixed at a position at the left end of the original placement portion 33, and the ADF 34 conveys, one at a time, each original that is set in the original tray 36 to a position at which the original can be read by the CCD image sensor 40, to thereby read each original.

A console 42 that includes various keys that can be pressed by a user is provided on the top surface of a front end part of the original reading portion 3. Using this console 42, a user can perform various input operations for operating the multifunction apparatus 1. Further, at the front end part of the original reading portion 3 are provided a display portion 43 (one example of "display portion" and "warning portion") such as a liquid crystal display that displays various kinds of information and a audible portion 44 (one example of "audible portion" and "warning portion"; see FIG. 4) that is capable of sounding a warning sound or the like.

2. Electrical Configuration

Figure 4:
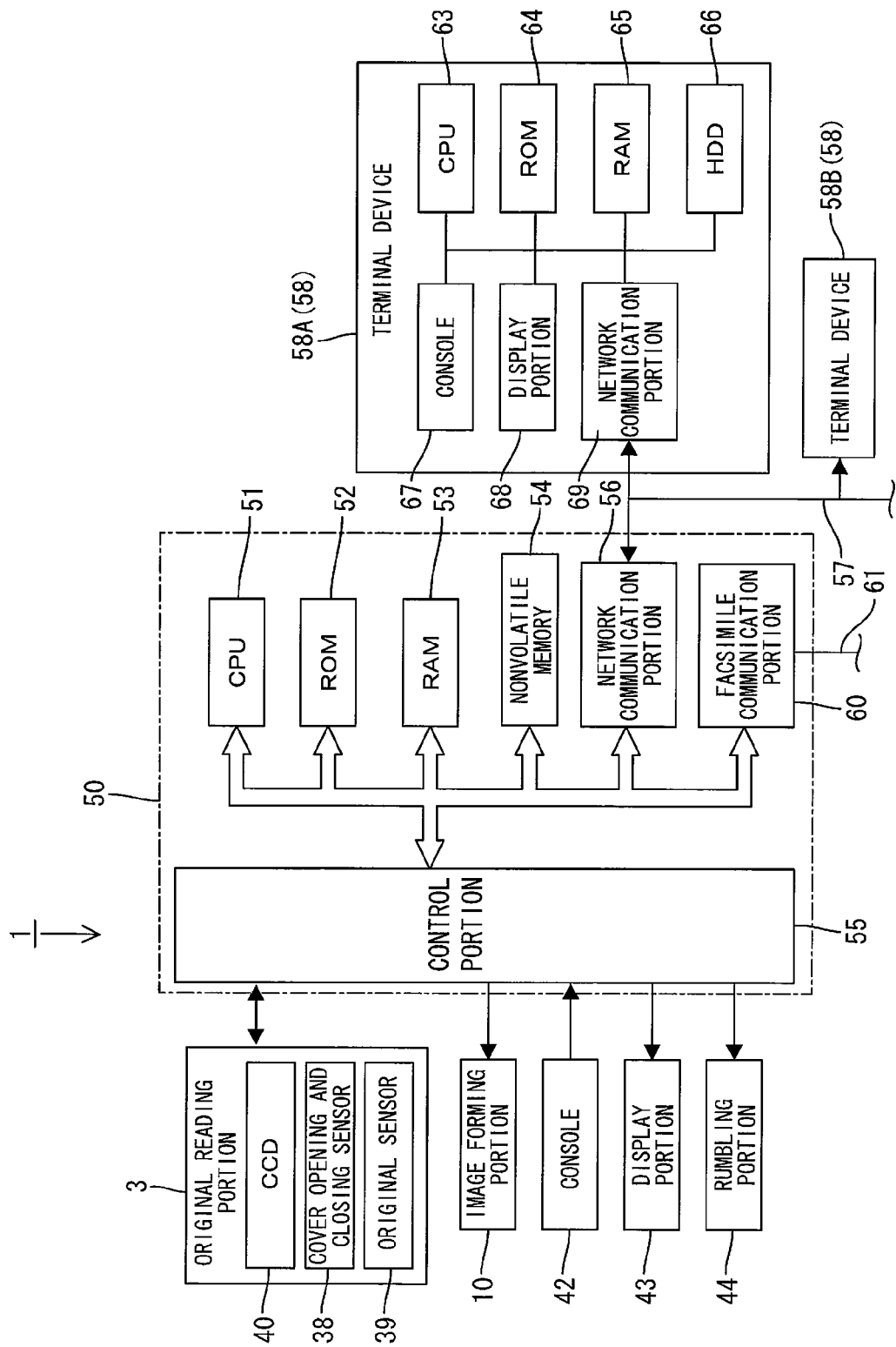
FIG. 4 is a block diagram that conceptually shows the electrical configuration of the multifunction apparatus.

Next, the electrical configuration of the multifunction apparatus 1 and an original reading system comprising one or more terminal devices 58 that are connected to the multifunction apparatus 1 through a communication line 57 is described. FIG. 4 is a block diagram that conceptually shows the electrical configuration of the original reading system.

The multifunction apparatus 1 includes a control apparatus 50 having a CPU 51, a ROM 52, a RAM 53, a nonvolatile memory 54, a control portion 55, a network communication portion 56, a facsimile communication portion 60 and the like.

Various control programs for controlling the multifunction apparatus 1, such as programs for executing network scan processing as described later, various settings and initial values and the like can be stored in the ROM 52. The RAM 53 is used as a work area to which various control programs are read out, or as a storage area that temporarily stores image data and the like that is acquired by reading an original.

In accordance with control programs that are read out from the ROM 52, the CPU 51 controls each component of the multifunction apparatus 1 through the control portion 55 while storing the processing results in the RAM 53 or the nonvolatile memory 54. In this connection, the CPU 51 has a function as a scan control portion and a communication monitoring portion of the present invention.

A plurality of external terminal devices 58 are connected through the communication line 57 to the network communication portion 56 (one example of "communication portion"), and mutual data communication is possible between each terminal device 58 and the network communication portion 56.

A telephone line 61 is connected to the facsimile communication portion 60, and sending and receiving of facsimile data that includes image data is possible between the facsimile communication portion 60 and an external facsimile device (not shown) through the telephone line 61. Those skilled in the art will appreciate that, in general, data can be transmitted in many ways without departing from the present invention. The transmission of data can include, but is not limited to, a wireless transmission or the like.

The control portion 55 can include an ASIC (Application Specific Integrated Circuit) capable of controlling operations of each portion such as the original reading portion 3, the image forming portion 10, the console 42, the display portion 43 and the audible portion 44 as described above via the CPU 51.

The terminal device 58 can include a CPU 63, a ROM 64, a RAM 65, a memory member 66, a console 67 (one example of "command input portion") such as a keyboard or a mouse, a display portion 68 such as a liquid crystal display, and a network communication portion 69 (one example of "terminal-side communication portion"). Programs for executing network scan processing on a terminal side and the like (described later) can be stored on a memory member 66 (which can include a hard disk drive or a flashed based memory), and the CPU 63 can read the programs from the memory member 66 and activate the programs based on activation commands that are input from the console 67.

3. Network Scan Processing

Next, the processing contents on a side of the multifunction apparatus 1 when executing a network scan, and the processing contents on the side of a terminal device 58 A that issues a network read command will be described.

(Network Scan Processing on Multifunction Apparatus Side)

Figure 5:
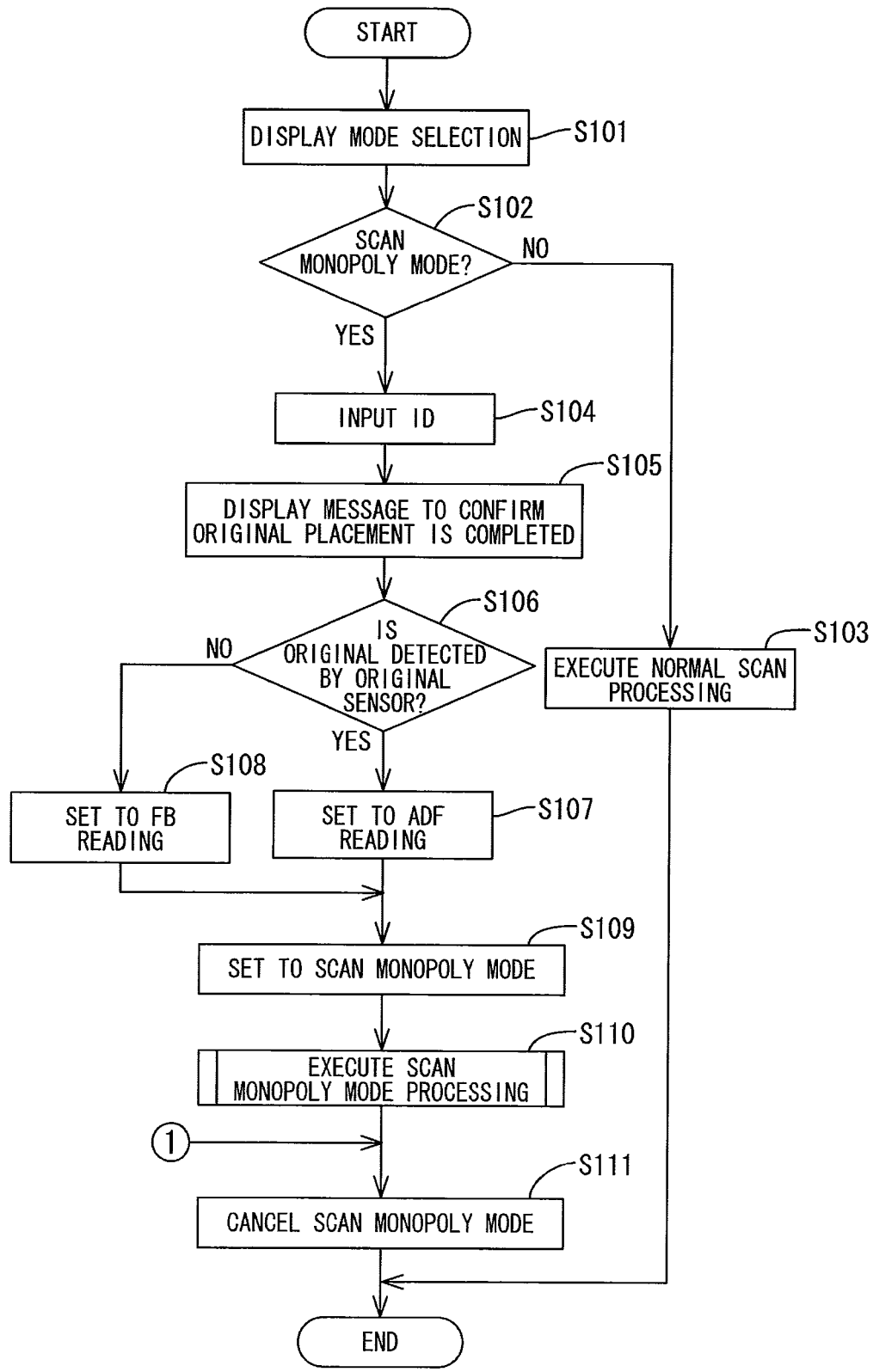
FIG. 5 is a flowchart showing the flow of network scan processing.
Figure 6:
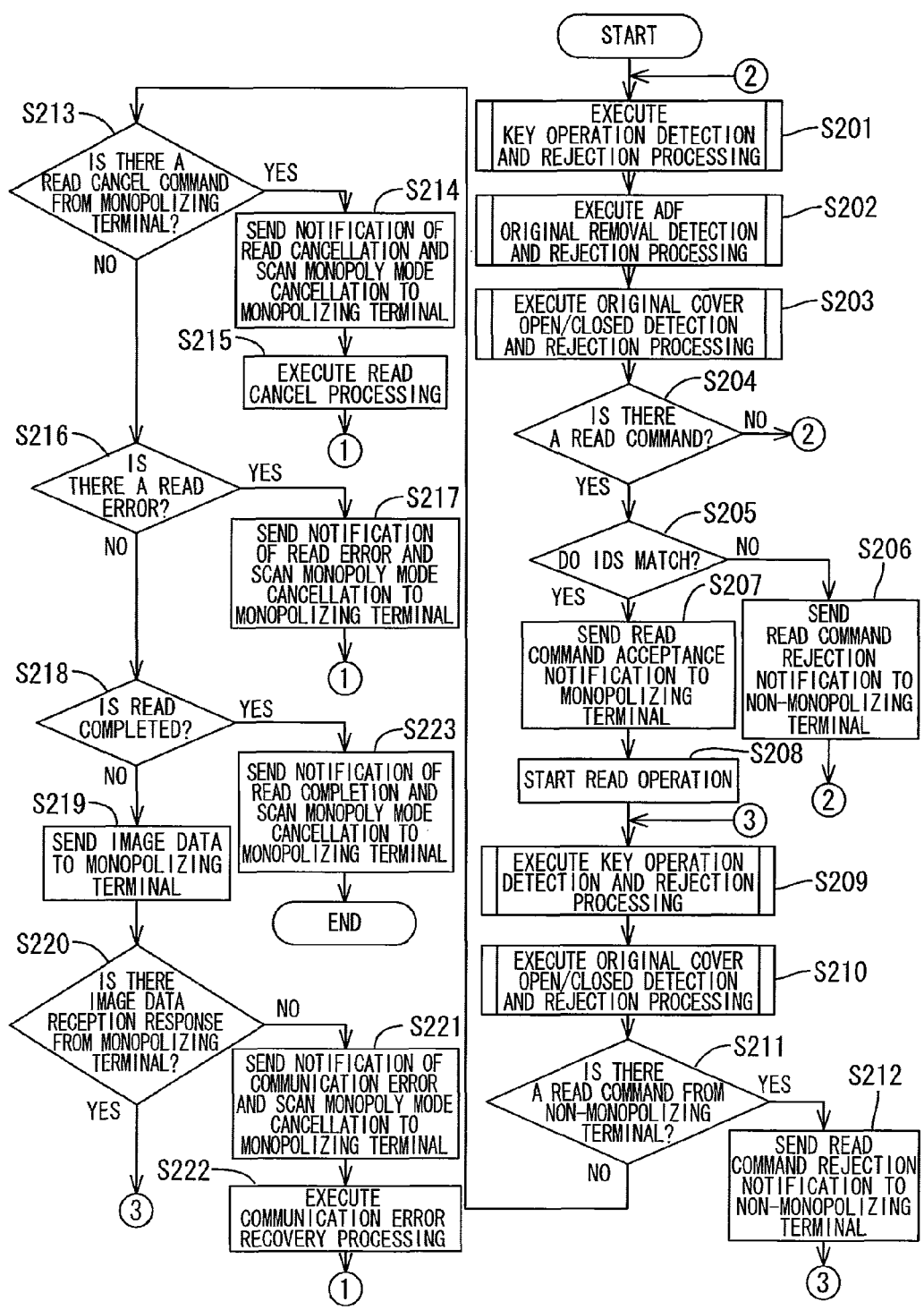
FIG. 6 is a flowchart showing the flow of scan monopoly mode processing.
Figure 7:
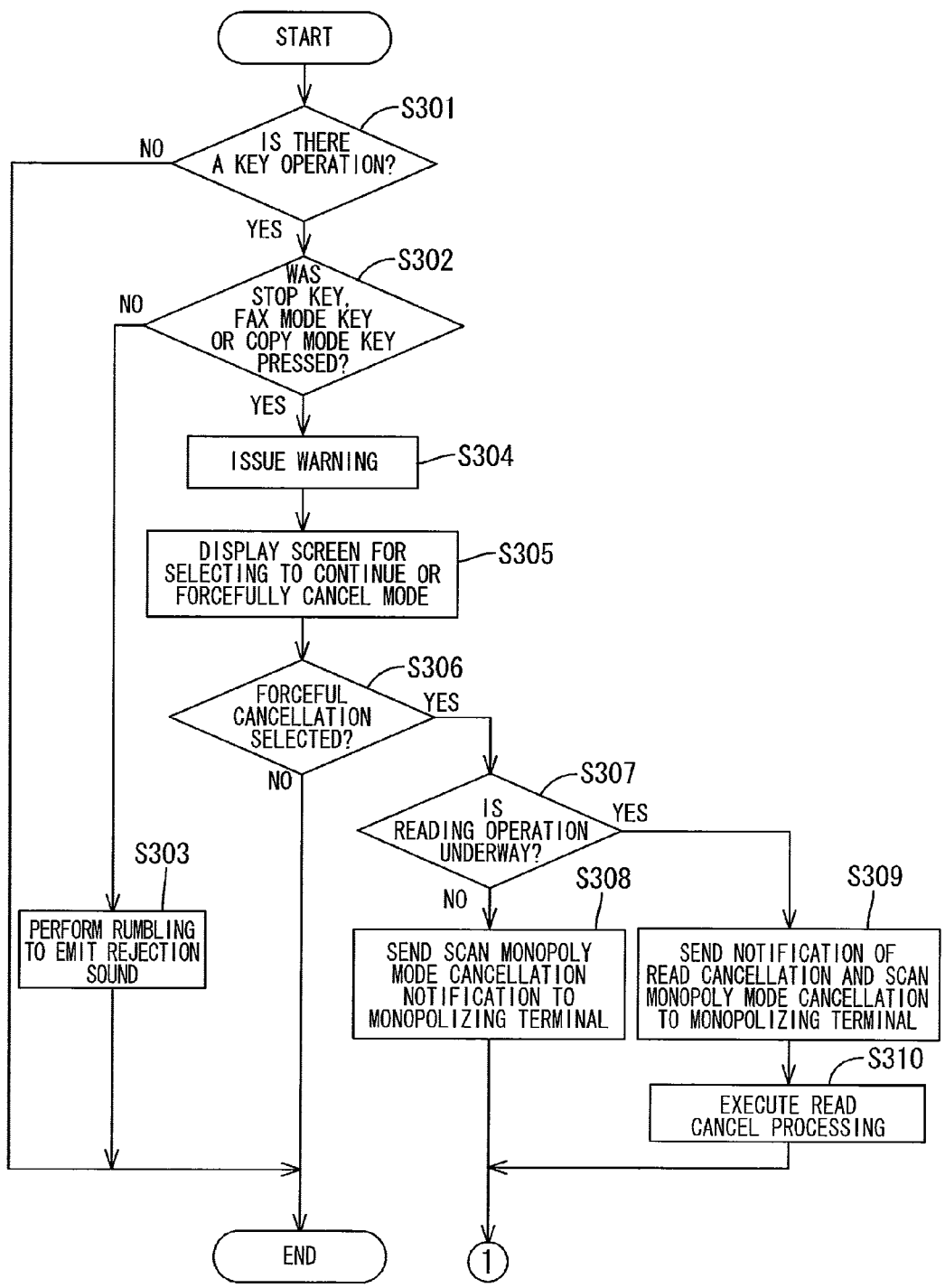
FIG. 7 is a flowchart showing the flow of key operation detection and rejection processing.

FIGS. 5 to 7 are flowcharts that illustrate the flow of processing according to control by the CPU 51 in the multifunction apparatus 1.

When performing a network scan, first the user places an original on the original placement portion 33 or the original tray 36, and then selects a network scan by a key operation on the console 42. Upon receipt of this key operation, the CPU 51 starts the network scan processing (communication scan processing) shown in FIG. 5.

When starting network scan processing, the CPU 51 first displays a mode selection display on the display portion 43 to give the user the option to select scan monopoly mode or normal scan mode (S101). Next, when scan monopoly mode is not selected (i.e. when normal scan mode is selected) (S102: No), the CPU 51 executes normal scan processing (S103). Although a detailed description of normal scan processing is omitted herein, normal scan processing is processing that executes a network scan without monopolizing the scan function as opposed to the scan monopoly mode processing described hereunder. More specifically, when a read command is received from a terminal device 58, processing is performed to execute a reading operation for an original in accordance with that read command without checking the ID or the like, and then send the acquired image data to the terminal device 58.

In contrast, when scan monopoly mode is selected (S102: Yes), the CPU 51 displays an ID input screen on the display portion 43 to make the user input an ID (authentication information) from the console 42 (S104). In this case, for example, the CPU 51 displays information such as user names and terminal device names that is previously stored, for example, in the nonvolatile memory 54 on the display portion 43. This allows the user to select from that information (i.e. the user name and terminal device name) that performs the network scan. By means of the ID input in this manner, the CPU 51 specifies the terminal device 58 which monopolizes the network scan function and stores the ID information in the RAM 53. In the following description, the terminal device 58 which monopolizes the network scan function is referred to as monopolizing terminal 58A, and a terminal device that is not the monopolizing terminal 58A is referred to as non-monopolizing terminal 58B.

Next, the CPU 51 displays a confirmation message on the display portion 43 for confirming that placement of the original is completed (S105). When the user presses the OK key on the console 42 to confirm that placement of the original is completed, the CPU 51 then determines whether or not an original is detected on the original tray 36 by the original sensor 39 of the original reading portion 3 (S106). In this case, when an original is detected on the original tray 36 (S106: Yes), the CPU 51 makes a setting so as to perform ADF reading when performing a read operation for the original at the original reading portion 3 (S107). In contrast, when an original is not detected on the original tray 36 (S106: No), the CPU 51 makes a setting so as to perform FB reading at the original reading portion 3 (S108).

Subsequently, the CPU 51 sets the scan monopoly mode to ON (S109), and after executing scan monopoly mode processing (S110), the CPU 51 cancels the scan monopoly mode (S111) and ends the network scan processing.

(Scan Monopoly Mode Processing)

When starting scan monopoly mode processing, as shown in FIG. 6, the CPU 51 executes key operation detection and rejection processing (S201), ADF original removal detection and rejection processing (S202), and original cover open/closed detection and rejection processing (S203), preferably in that order. The contents of each of these kinds of processing is described in order hereunder.

(A) Key Operation Detection and Rejection Processing

When starting key operation detection and rejection processing, as shown in FIG. 7, the CPU 51 first determines whether or not a key operation was performed at the console 42 (S301), and when a key operation has not been performed (S301: No) the CPU 51 ends the key operation detection and rejection processing. When a key operation was performed (S301: Yes), the CPU 51 determines whether or not the key that was operated (pressed) is any one of the members of the group consisting of a stop key, a facsimile mode key, and a copy mode key (S302). If the key that was operated (pressed) is not any one of these keys (S302: No), the CPU 51 causes the audible portion 44 to emit a rejection sound (S303) and ends the key operation detection and rejection processing.

In contrast, when the key that was operated (pressed) is any one of the members of the group consisting of the stop key, the facsimile mode key, and the copy mode key (S302: Yes), the CPU 51 warns the user by displaying a message to the effect that the multifunction apparatus 1 is currently in scan monopoly mode on the display portion 43, and also emits a warning sound from the audible portion 44 (S304).

Next, the CPU 51 causes the display portion 43 to display options for the user to select whether to continue or to forcefully cancel the scan monopoly mode (S305). When forceful cancellation is not selected (when the user selected to continue scan monopoly mode) (S306: No), the CPU 51 ends the key operation detection and rejection processing.

In contrast, when forceful cancellation of the scan monopoly mode is selected (i.e. when a cancel command is input) (S306: Yes), the CPU 51 determines whether or not the original reading portion 3 is currently performing a read operation (S307). When the original reading portion 3 is not currently performing a read operation (S307: No), the CPU 51 sends a notification signal to the monopolizing terminal 58A through the network communication portion 56 to notify the user at the monopolizing terminal 58A to the effect that the CPU 51 is cancelling the scan monopoly mode (S308). The CPU 51 then quits the key operation detection and rejection processing, cancels the scan monopoly mode at S111 in FIG. 5, and ends the network scan processing.

In contrast, at S307, when the original reading portion 3 is currently performing a read operation (S307: Yes), the CPU 51 sends a notification signal to the monopolizing terminal 58A through the network communication portion 56 to notify the user at the monopolizing terminal 58A to the effect that the CPU 51 is cancelling (terminating) the read operation and also cancelling the scan monopoly mode (S309). Thereafter, the CPU 51 executes read cancel processing (S310). In this read cancel processing, the CPU 51 executes processing to delete image data that is stored (for example, on the RAM 53), and in the case of ADF reading, to feed out originals that are currently being read by the ADF 34. The CPU 51 then quits the key operation detection and rejection processing, cancels the scan monopoly mode at S111 in FIG. 5, and ends the network scan processing.

(B) ADF Original Removal Detection and Rejection Processing

Figure 8:
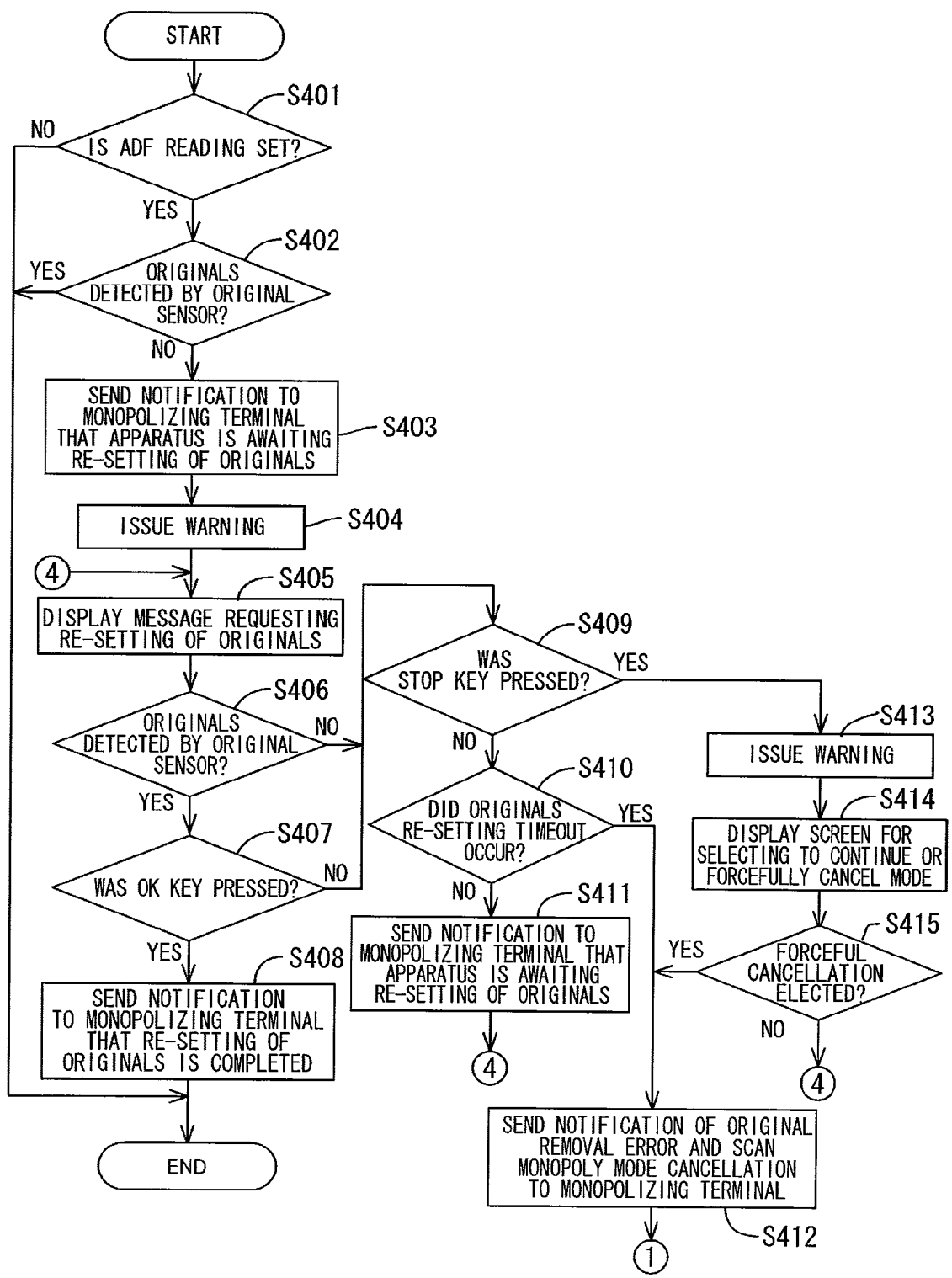
FIG. 8 is a flowchart showing the flow of ADF original removal detection and rejection processing.

When starting ADF original removal detection and rejection processing, as shown in FIG. 8, the CPU 51 first determines whether or not ADF reading is set (S401). If ADF reading is not set (S401: No), the CPU 51 ends the ADF original removal detection and rejection processing. In contrast, if ADF reading is set (S401: Yes), the CPU 51 determines whether or not originals are detected on the original tray 36 by the original sensor 39 (S402). In this case, when originals are detected on the original tray 36 (i.e. the originals have not been removed) (S402: Yes), the CPU 51 ends the ADF original removal detection and rejection processing.

In contrast, when originals are not detected on the original tray 36 (i.e. the originals have been removed) (S402: No), the CPU 51 sends a notification signal (one example of "warning signal") to the monopolizing terminal 58A through the network communication portion 56 to notify the user at the monopolizing terminal 58A to the effect that the orignials on the original tray 36 were removed and the multifunction apparatus 1 is in a state awaiting re-setting of originals (S403). Next, the CPU 51 warns the user that removed the originals by displaying a message to the effect that the multifunction apparatus 1 is currently in scan monopoly mode on the display portion 43 and also emitting a warning sound from the audible portion 44 (S404). The CPU 51 then displays a message on the display portion 43 to prompt the user to re-set the originals on the original tray 36 (S405).

Next, the CPU 51 determines whether or not originals are detected on the original tray 36 by the original sensor 39 (S406). If originals are detected, the CPU 51 determines whether or not the OK key has been pressed at the console 42 to indicate that re-setting of the originals is completed (S407). If the OK key was pressed, the CPU 51 sends a notification signal to the monopolizing terminal 58A through the network communication portion 56 to notify the user at the monopolizing terminal 58A to the effect that re-setting of the originals is completed (S408), and then ends the ADF original removal detection and rejection processing.

In contrast, when originals are not detected on the original tray 36 at S406 (S406: No) or when the OK key is not pressed at S407 (S407: No), the CPU 51 determines whether or not the stop key has been pressed at the console 42 (S409). In this case, when the stop key has not been pressed (S409: No), the CPU 51 determines whether or not a timeout time for original re-setting has elapsed since the time at which removal of originals is detected by the original sensor 39 at S402 (S410). If the timeout time has not elapsed (S410: No), the CPU 51 sends a notification signal to the monopolizing terminal 58A through the network communication portion 56 to notify the user at the monopolizing terminal 58A to the effect that the multifunction apparatus 1 is in a state awaiting re-setting of the ADF originals (S411). The CPU 51 then returns to S405 to repeat the operation to display a message on the display portion 43 to prompt the user to re-set the originals.

When the timeout time has elapsed at S410 (S410: Yes), a notification signal to notify the user at the monopolizing terminal 58A to the effect that an original removal error has occurred and also that the multifunction apparatus 1 is cancelling the scan monopoly mode is sent to the monopolizing terminal 58A from the network communication portion 56 (S412). The CPU 51 then quits this ADF original removal detection and rejection processing, cancels the scan monopoly mode at S111 of FIG. 5, and ends the network scan processing.

In contrast, when the stop key has been pressed at S409 (S409: Yes), the CPU 51 warns the user (that pressed the stop key) by displaying a message to the effect that the multifunction apparatus 1 is currently in scan monopoly mode on the display portion 43 and also emitting a warning sound from the audible portion 44 (S413).

Next, the CPU 51 causes the display portion 43 to display a screen to make the user select whether to continue or to forcefully cancel the scan monopoly mode (S414). When forceful cancellation is not selected (when the user selected to continue scan monopoly mode) (S415: No), the CPU 51 returns to S405 to repeat the operation to display a message on the display portion 43 to prompt the user to re-set the originals. In contrast, when forceful cancellation of the scan monopoly mode is selected (S415: Yes), the processing advances to S412 to notify the user at the monopolizing terminal 58A to the effect that an original removal error has occurred and also that the multifunction apparatus 1 is cancelling the scan monopoly mode, and thereafter the CPU 51 quits the ADF original removal detection and rejection processing, cancels the scan monopoly mode at S111 of FIG. 5, and ends the network scan processing.

(C) Original Cover Open/Closed Detection and Rejection Processing

Figure 9:
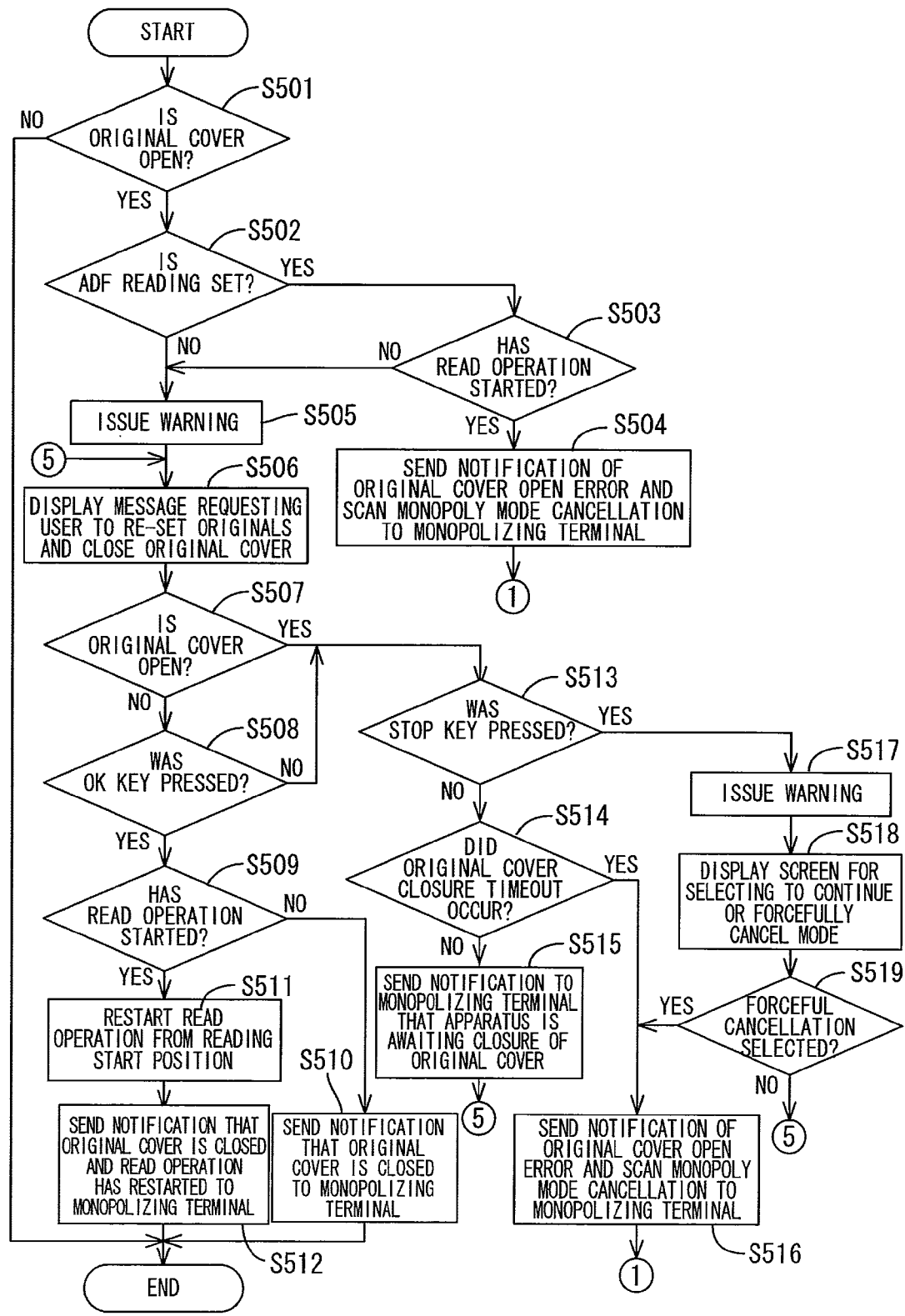
FIG. 9 is a flowchart showing the flow of original cover open/closed detection and rejection processing.

When starting original cover open/closed detection and rejection processing, as shown in FIG. 9, the CPU 51 first determines whether or not the cover opening and closing sensor 38 has detected that the original cover 35 is in an open state (S501), and if the original cover 35 is in a closed state (S501: No), the CPU 51 ends the original cover open/closed detection and rejection processing.

In contrast, if the original cover 35 is in an open state (S501: Yes), the CPU 51 determines whether or not ADF reading is set (S502). If ADF reading is set (S502: Yes), the CPU 51 determines whether or not a read operation has been started at the original reading portion 3 (S503). If a read operation has been started (S503: Yes), since an operation by the ADF 34 to re-read the originals is difficult, the CPU 51 sends a notification signal (one example of "warning signal") to the monopolizing terminal 58A through the network communication portion 56 to notify the user at the monopolizing terminal 58A to the effect that an error has occurred because the original cover is open and also that the multifunction apparatus 1 is cancelling the scan monopoly mode (S504). The CPU 51 then quits the original cover open/closed detection and rejection processing, cancels the scan monopoly mode at S111 of FIG. 5, and ends the network scan processing.

In contrast, if a read operation has not been started at the original reading portion 3 (S503: No) or if ADF reading is not set (i.e. FB reading is set; S502: No), since it is possible to proceed with an operation to read an original at the original reading portion 3, the CPU 51 warns the user (that opened the original cover 35) by displaying a message to the effect that the multifunction apparatus 1 is currently in scan monopoly mode on the display portion 43, and also emits a warning sound from the audible portion 44 (S505).

Next, the CPU 51 causes the display portion 43 to display a message prompting the user to re-set the original and close the original cover 35 (S506). More specifically, in the case of ADF reading, a message is displayed to prompt the user to close the original cover 35 and re-set the original in the original tray 36. Further, in the case of FB reading, a message is displayed to prompt the user to re-set the original on the original placement portion 33 and close the original cover 35.

Next, the CPU 51 determines whether or not the cover opening and closing sensor 38 detects that the original cover 35 is in an open state (S507). If the original cover 35 is in a closed state, the CPU 51 determines whether or not the OK key has been pressed to indicate that re-setting of the original is completed (S508). If the OK key was pressed (S508: Yes), the CPU 51 determines whether or not a read operation has started at the original reading portion 3 (S509).

If a read operation has not yet started (S509: No), the CPU 51 sends a notification signal to the monopolizing terminal 58A through the network communication portion 56 to notify the user at the monopolizing terminal 58A to the effect that the original cover 35 has been closed (S510), and thereafter ends the original cover open/closed detection and rejection processing. In contrast, if a read operation has already started (this falls under the case of FB reading) (S509: Yes), the CPU 51 restarts a read operation by the CCD image sensor 40 of the original reading portion 3 from the initial reading start position (top portion of the original) of the original on the original placement portion 33 (S511). The CPU 51 then sends a communication signal to the monopolizing terminal 58A through the network communication portion 56 to notify the user at the monopolizing terminal 58A to the effect that the original cover 35 has been closed and that the read operation has restarted (S512), and thereafter ends the original cover open/closed detection and rejection processing.

When it is detected at S507 that the original cover 35 is in an open state (S507: Yes), or that the OK key has not been pressed at S508 (S508: No), the CPU 51 determines whether or not the stop key on the console 42 has been pressed (S513). When the stop key has not been pressed (S513: No), the CPU 51 determines whether a timeout time for closing the original cover has elapsed since the time at which opening of the original cover 35 was detected at S501 (S514). If the timeout time has not elapsed (S514: No), the CPU 51 sends a notification signal to the monopolizing terminal 58A through the network communication portion 56 to notify the user at the monopolizing terminal 58A to the effect that the multifunction apparatus 1 is in a state awaiting closure of the original cover 35 (S515). The CPU 51 then returns to S506 to repeat the operation to display a message on the display portion 43 to prompt the user to re-set the originals and close the original cover 35.

When the timeout time has elapsed at S514 (S514: Yes), the CPU 51 sends a notification signal (one example of "warning signal") to the monopolizing terminal 58A from the network communication portion 56 to notify the user at the monopolizing terminal 58A to the effect that an original cover open error has occurred and that the multifunction apparatus 1 is cancelling the scan monopoly mode (S516). The CPU 51 then quits the original cover open/closed detection and rejection processing, cancels the scan monopoly mode at S111 of FIG. 5, and ends the network scan processing.

In contrast, when the stop key was pressed at S513 (S513: Yes), the CPU 51 warns the user (that pressed the stop key) by displaying a message to the effect that the multifunction apparatus 1 is currently in scan monopoly mode on the display portion 43 and also emitting a warning sound from the audible portion 44 (S517).

Next, the CPU 51 causes the display portion 43 to display a screen to give the user the option to select whether to continue or to forcefully cancel the scan monopoly mode (S518). When forceful cancellation is not selected (when the user selected to continue scan monopoly mode) (S519: No), the CPU 51 returns to S506 to repeat the operation to display a message on the display portion 43 to prompt the user to re-set the original and close the original cover 35. In contrast, when forceful cancellation of the scan monopoly mode is selected (S519: Yes), the processing advances to S516 to notify the user at the monopolizing terminal 58A to the effect that an original cover open error has occurred and also that the multifunction apparatus 1 is cancelling the scan monopoly mode, and thereafter the CPU 51 quits the original cover open/closed detection and rejection processing, cancels the scan monopoly mode at S111 of FIG. 5, and ends the network scan processing.

As described in the foregoing, when the CPU 51 starts scan monopoly mode processing, as shown in FIG. 6, the CPU 51 executes key operation detection and rejection processing (S201), ADF original removal detection and rejection processing (S202), and original cover open/closed detection and rejection processing (S203), preferably in that order. Next, the CPU 51 determines whether or not a read command has been received from a terminal device 58 through the network communication portion 56 (S204). When a read command has not been received (S204: No), the CPU 51 returns to S201 to repeat the same processing.

When a read command has been received (S204: Yes), the CPU 51 determines whether or not the ID (authentication information that is included in the read command) matches the ID that was input at the console 42 (S205). When the two IDs do not match (S205: No), the CPU 51 notifies the non-monopolizing terminal 58B that sent the read command to the effect that the scanning apparatus rejects the read command, through the network communication portion 56 (S206). The CPU 51 then returns to S201 to repeat the same processing. In contrast, when the two IDs match (S205: Yes), the CPU 51 notifies the monopolizing terminal 58A (that sent the read command) that the read command is accepted (S207), and then starts an operation to read the original using the original reading portion 3 (S208).

Next, the CPU 51 executes the aforementioned key operation detection and rejection processing and original cover open/closed detection and rejection processing (S209, S210). The CPU 51 then determines whether or not a read command was received from a non-monopolizing terminal 58B based on the ID (included in the read command) as described above (S211). When a read command was received from a non-monopolizing terminal 58B (S211: Yes), the CPU 51 notifies the non-monopolizing terminal 58B that sent the read command to the effect that the scanning apparatus rejects the read command (S212), and the CPU 51 then returns to S209 to repeat the same processing.

In contrast, when a read command was not received from a non-monopolizing terminal 58B (S211: No), the CPU 51 determines whether or not a read cancel command was received from the monopolizing terminal 58A based on the ID included in the read cancel command (S213). When a read cancel command was received from the monopolizing terminal 58A (S213: Yes), the CPU 51 sends a notification signal to the monopolizing terminal 58A through the network communication portion 56 to notify the user at the monopolizing terminal 58A to the effect that the CPU 51 is cancelling (terminating) the read operation and also cancelling the scan monopoly mode (S214). Thereafter, the CPU 51 executes read cancel processing (S215). The CPU 51 then quits the scan monopoly mode processing, cancels the scan monopoly mode at S111 of FIG. 5, and ends the network scan processing.

When a read cancel command has not been received from the monopolizing terminal 58A (S213: No), the CPU 51 determines (based on a signal from the original reading portion 3) whether or not an original reading error (jammed original or the like) has occurred at the original reading portion 3 (S216). When a reading error has occurred (S216: Yes), the CPU 51 notifies the monopolizing terminal 58A to the effect that a reading error occurred and that the multifunction apparatus 1 is cancelling the scan monopoly mode (S217). The CPU 51 then quits the scan monopoly mode processing, cancels the scan monopoly mode at S111 of FIG. 5, and ends the network scan processing.

When a reading error has not occurred (S216: No), the CPU 51 determines whether or not reading of originals has finished (S218). When reading of originals has not finished (S218: No), the CPU 51 sends the image data that is, for example, stored in the RAM 53 to the monopolizing terminal 58A through the network communication portion 56 (S219). The CPU 51 then determines whether or not there is a response to reception of the image data from the monopolizing terminal 58A (S220). If there is a reception response (S220: Yes), the CPU 51 returns to S209 to repeat the same processing. In contrast, if there is not a reception response within a predetermined time (S220: No), the CPU 51 notifies the monopolizing terminal 58A to the effect that a communication error occurred and also that the multifunction apparatus 1 is cancelling the scan monopoly mode (S221), and thereafter performs communication error recovery processing (S222). The CPU 51 then quits the scan monopoly mode processing, cancels the scan monopoly mode at S111 in FIG. 5, and ends the network scan processing.

When reading of originals is completed at S218 (S218: Yes), the CPU 51 notifies the monopolizing terminal 58A that reading of originals is completed and also that the multifunction apparatus 1 is cancelling the scan monopoly mode (S219), and then ends the scan monopoly mode processing.
(Network Scan Processing on Terminal Side)

Figure 10:
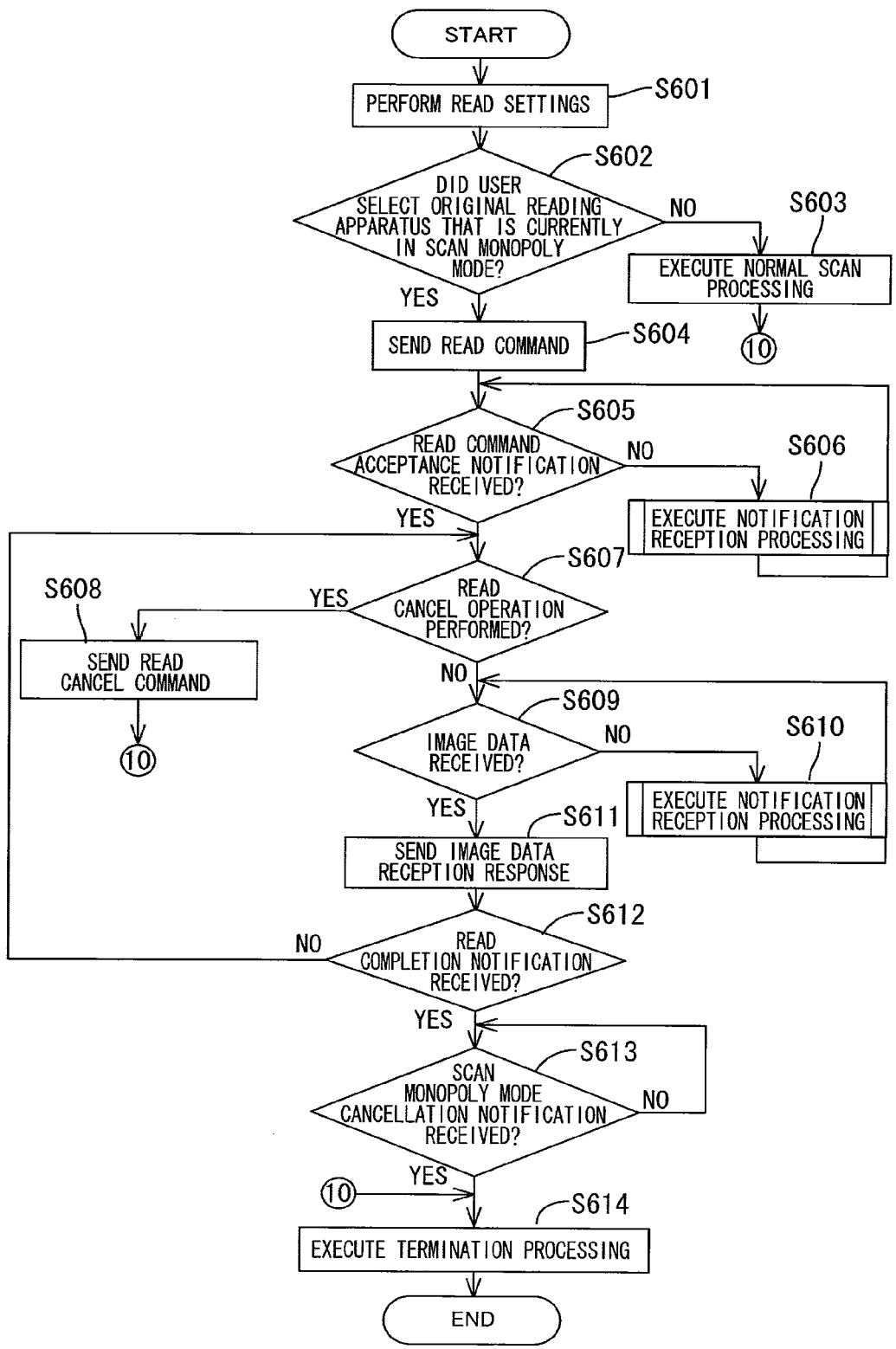
FIG. 10 is a flowchart showing the flow of network scan processing on a terminal side.
Figure 11:
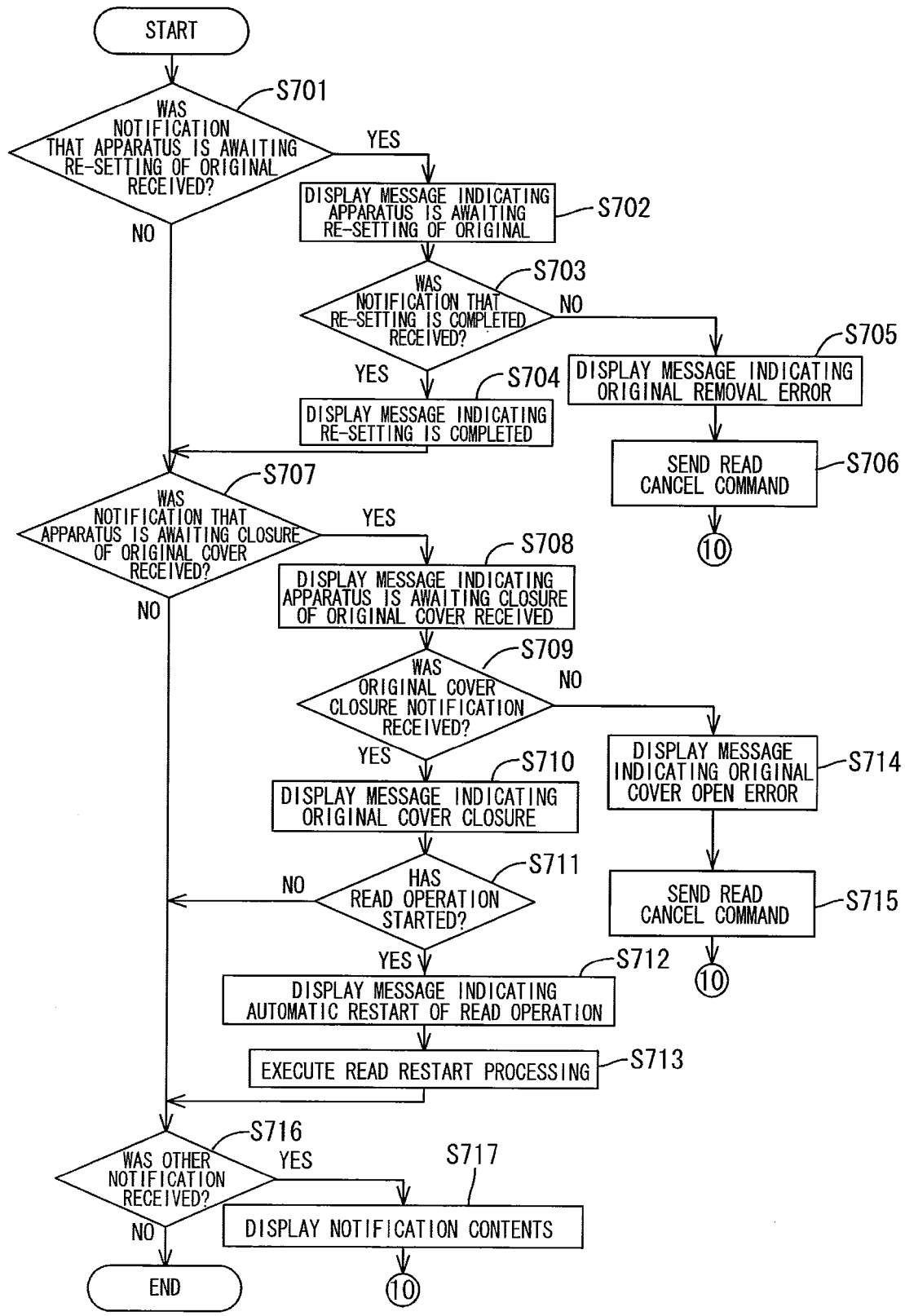
FIG. 11 is a flowchart showing the flow of notification reception processing.

FIGS. 10 and 11 are flowcharts illustrating the flow of processing by control of a CPU 63 at a terminal device 58.

When the CPU 63 starts network scan processing on the terminal side, it first displays a read setting screen on the display portion 68 (S601). In this case, various reading conditions such as selection of the original reading apparatus to perform the network scan (in this case, the multifunction apparatus 1 on which the original has been placed) and the reading resolution and the like are input through a console 67 by the user, and finally the user inputs a command to start the network scan. Subsequently, the CPU 63 determines whether or not the multifunction apparatus 1 that was selected by the user is currently in scan monopoly mode (S602). When the multifunction apparatus 1 is not in scan monopoly mode (S602: No), the CPU 63 executes normal scan processing that executes a network scan without monopolizing the scan function (S603). The CPU 63 then executes termination processing (S614) to terminate the network scan processing on the terminal side.

In contrast, when the multifunction apparatus 1 (that was selected by the user) is currently in scan monopoly mode (S602: Yes), the CPU 63 sends a read command to the multifunction apparatus 1 through the network communication portion 69 (S604). The read command includes the aforementioned reading conditions as well as the ID of the terminal device 58 or the user.

Next, the CPU 63 determines whether or not a read command acceptance notification (see S207 in FIG. 6) was received from the multifunction apparatus 1 (S605), and if a read command acceptance notification has not been received (S605: No), the CPU 63 executes a notification reception processing (S606).
(A) Notification Reception Processing In this notification reception processing, processing is performed to correspond to the receipt of various kinds of notifications from the multifunction apparatus 1. First, when a notification is received that the multifunction apparatus 1 is in a state awaiting re-setting of ADF originals (see S403 and S411 in FIG. 8) (S701: Yes), the CPU 63 displays a message to the effect that the multifunction apparatus 1 is in a state awaiting re-setting of ADF originals on the display portion 68 (S702, one example of "warning operation"). Subsequently, when a notification from multifunction apparatus 1 is received that re-setting of ADF originals has been completed (see S408 in FIG. 8) (S703: Yes), the CPU 63 displays a message to the effect that re-setting of ADF originals is completed on the display portion 68 (S702). If a notification that re-setting of ADF originals has been completed is not received within a predetermined time (S703: No), the CPU 63 causes a message to be displayed that an ADF originals removal error has occurred (S705), and sends a read cancel command to the multifunction apparatus 1 (S706). Thereafter, the CPU 63 quits the notification reception processing, and performs termination processing at S614 in FIG. 10 to terminate the network scan processing on the terminal side.

When a notification is received that the multifunction apparatus 1 is in a state awaiting closure of the original cover (S707: Yes), the CPU 63 displays a message that multifunction apparatus 1 is in a state awaiting closure of the original cover on the display portion 68 (S708, one example of "warning operation"). Subsequently, when a notification that the original cover is closed is received from the multifunction apparatus 1 (S709: Yes), the CPU 63 displays a message to the effect that the original cover is closed on the display portion 68 (S710). In a case where a read operation has already started at the original reading portion 3 (S711: Yes), the CPU 63 displays a message that read operation has been automatically restarted on the display portion 68 (S712), and performs read restart processing such as deletion of image data that is stored, for example, on the RAM 65 (S713).

If a notification that the original cover is closed is not received within a predetermined time at S709 (S709: No), the CPU 63 displays a message to the effect that an original cover 35 open error has occurred on the display portion 68 (S714), and sends a read cancel command to the multifunction apparatus 1 (S706). Thereafter, the CPU 63 quits the notification reception processing, and performs termination processing at S614 in FIG. 10 to terminate the network scan processing on the terminal side.

When a notification if received other than those described above, such as an error notification from the multifunction apparatus 1 (S716: Yes), the CPU 63 displays a message corresponding to the contents of the notification on the display portion 68 (S717). Specifically, in this case the notification from multifunctional apparatus 1 can refer to a read cancel notification (see S214 and S309), a reading error notification (see S216), a communication error notification (see S221), original removal error notification (see S412), an original cover open error notification (see S504 and S516), or a scan monopoly mode cancellation notification (see S214, S217, S221, S223, S308, S309, S412, S504 and S516). Thereafter, the CPU 63 quits the notification reception processing, and performs termination processing at S614 in FIG. 10 to terminate the network scan processing on the terminal side. Further, when these notifications are not received (S716: No), the CPU 63 ends the notification reception processing.

As described in the foregoing, when a read command acceptance notification is not received at S605 in FIG. 10 (S605: No), the CPU 63 executes the above-mentioned notification reception processing (S606), and after finishing the notification reception processing the CPU 61 returns the operation to S605 to repeat the same processing. Subsequently, if a read command acceptance notification is received (S605: Yes), the CPU 63 determines whether or not a read cancel operation was performed using the console 67 (S607). If a read cancel operation was performed (S607: Yes), after sending a read cancel command to the multifunction apparatus 1 (S608), the CPU 63 performs termination processing (S614) to end the network scan processing on the terminal side.

If a read cancel operation is not performed (S607: No), the CPU 63 determines whether or not image data has been received from the multifunction apparatus 1 (S609). When image data has not been received (S609: No), after executing the aforementioned notification reception processing (S610), the CPU 63 returns to S609 to repeat the same processing. Subsequently, when image data is received (S609: Yes), the CPU 63 sends an image data reception response to the multifunction apparatus 1 (S611). Therafter, the CPU 63 determines whether or not a read completion notification (see S223) has been received from the multifunction apparatus 1 (S612), and when a read completion notification has not been received (S612: No), the CPU 63 returns to S607 to repeat the same processing.

If a read completion notification is received from the multifunction apparatus 1 (S612: Yes), the CPU 63 determines whether or not a scan monopoly mode cancellation notification (see S223) was received from the multifunction apparatus 1 (S613). When a scan monopoly mode cancellation notification is received (S613: Yes), the CPU 63 performs termination processing (S614) to end the network scan processing on the terminal side.

4. Effects of the Present Illustrative Aspect

If an operation that obstructs scanning, such as an input operation on the console 42, removal of originals from the original tray 36, or an operation to open the original cover 35 is detected when executing network scan processing, a warning is issued. It is thus possible for the user to carry out steps to continue or cancel the network scan as appropriate.

Further, since there is a possibility that reading will not be performed normally when the original cover 35 is opened during a read operation, it is preferable to stop the read operation.

In a case where the original cover 35 is closed after interrupting a read operation, since the read operation can be restarted without the user returning to the multifunction apparatus 1 to perform operations for the communication scan again, user friendliness is enhanced.

Further, when a read operation is restarted after closing the original cover 35, since there is a possibility of a disadvantage occurring such as the position of the original being moved or the original being changed for another original, it is preferable that the user can ascertain that the read operation has restarted.

Further, when restarting a read operation, when reading of an original starts from the position at which reading of the original was interrupted, there is a possibility that a portion of the image (of the image data) that was read will be lost (or the like) because the position of the original was moved during the interruption. According to the present configuration, since reading is performed again from the initial reading start position it is possible to prevent loss (or the like) of image data.

Further, since a warning at the time of an operation that obstructs scanning is carried out using either the display of the display portion 43 and/or a sound from the audible portion 44, it is possible to issue an effective warning to the user that performed the operation that obstructs scanning.

Furthermore, when an operation that obstructs scanning is performed, a warning can also be sent to the user that is in a place located away from the multifunction apparatus 1 by sending a communication signal (warning signal) to the terminal device 58 from the network communication portion 56. Thus, the user can ascertain that there is a possibility that the desired image data may not be obtained because an operation that obstructs scanning was performed.

Further, since image data is sent to a terminal device 58 only when a read command has specific authentication information, a situation in which image data is sent to the wrong terminal device 58 can be prevented.

Furthermore, when executing network scan processing, since sending of image data is permitted based on the condition that an ID (authentication information) input by the user and an ID included in the read command from the terminal device match, even when a large number of users use the multifunction apparatus 1, erroneous sending of image data can be prevented.

Further, since network scan processing can be cancelled by an instruction from the user, the usability is enhanced.

Further, since only the user that input the ID (authentication information) can cancel the network scan processing, a situation in which the network scan processing is cancelled by another user can be prevented.

Furthermore, in a state in which communication cannot be carried out between the multifunction apparatus 1 and the terminal device 58, it is preferable to cancel the communication scan processing since the communication scan cannot be executed normally.

Further, when a reading error occurs, it is preferable to cancel the communication scan processing since the communication scan cannot be executed normally.

Although according to the above described illustrative aspect a multifunction apparatus comprising an original placement portion, an original conveying mechanism and a printing portion was described as one example of an original reading apparatus and an image forming apparatus, the present invention can also be applied to an original reading apparatus that does not comprise a printing portion, and can further be applied to an original reading apparatus or an image forming apparatus that comprises only an original placement portion or only an original conveying mechanism as a reading portion.

The above described illustrative aspect may also be configured such that, if a key operation is performed while performing communication scan processing, a warning signal notifying the user to that effect is sent to the terminal device.

The above described illustrative aspect may be configured such that, for example, a password is input as authentication information that is input from the console by the user, and may be configured such that, in this case, sending of data is permitted upon comparing that password with a password included in a read command that is sent from the terminal device.

According to the above described illustrative aspect, although cancellation of the scan monopoly mode cannot be performed from a non-monopolizing terminal, according to the present invention a configuration may be adopted in which the scan monopoly mode can be cancelled by a command to cancel the scan monopoly mode from a non-monopolizing terminal.

What is claimed is:

1. An original reading apparatus, comprising:
    a scanner configured to acquire image data by scanning an original placed thereon;
    a communication portion interactively connected to an external terminal device for communication;
    a console including a key and configured to allow a user to perform an input operation;
    at least one of a display portion configured to display various kinds of information including a warning and an audio alarm configured to sound a warning; and
    a controller configured to:
        determine whether an operation for setting a scan monopoly mode is performed by the user;
        set the scan monopoly mode if the operation is determined;
        receive a read command from the external terminal device through the communication portion;
        execute image data acquisition by the scanner based on the read command;
        send the acquired image data to the external terminal device through the communication portion;
        issue a warning by using the at least one of the display and the audio alarm if the key of the console is operated after the scan monopoly mode is set and before the read command is received;
        not issue the warning if the key of the console is operated but the scan monopoly mode is not set; and
        cancel the scan monopoly mode after the sending of the acquired image data is completed.

2. The original reading apparatus according to claim 1, wherein the controller is further configured to send a warning signal to the external terminal device through the communication portion, further wherein the warning signal is configured to cause a warning operation.

3. The original reading apparatus according to claim 1, wherein the controller is configured to permit sending of image data to the external terminal device on a condition that a read command that is sent from the external terminal device includes specific authentication information.

4. The original reading apparatus according to claim 3, wherein the controller is configured to acquire authentication information that is input to the console by a user and permit sending of image data to the external terminal device on a condition that the authentication information and authentication information that is included in the read command sent from the external terminal device match.

5. The original reading apparatus according to claim 4, wherein, when the cancel command is sent through the communication portion from the external terminal device during the scan monopoly mode, the controller cancels the scan monopoly mode on a condition that authentication information included in the cancel command matches authentication information that is input from the console.

6. The original reading apparatus according to claim 1, wherein, when a cancel command is input, the controller cancels the scan monopoly mode.

7. The original reading apparatus according to claim 1, wherein the controller is further configured to determine whether or not communication with the external terminal device by the communication portion is possible, wherein, when the controller determines that communication is not possible during the monopoly scan mode, the controller cancels the scan monopoly mode.

8. The original reading apparatus according to claim 1, wherein, when an error occurs in scanning of the original by the scanner during the scan monopoly mode, the controller cancels the scan monopoly mode.

9. An original reading apparatus, comprising:
    a scanner configured to acquire image data by scanning an original placed thereon;
    an original conveying mechanism configured to convey the original that is placed on an original tray to a position at which the scanning by the scanner is possible;
    a communication portion interactively connected to an external terminal device for communication;
    a console including a key and configured to allow a user to perform an input operation;
    at least one of a display portion configured to display various kinds of information including a warning and an audio alarm configured to sound a warning; and
    a controller configured to:
        detect whether the original is on the original tray;
        determine whether an operation for setting a scan monopoly mode is performed by the user;
        set the scan monopoly mode if the operation is determined;
        receive a read command from the external terminal device through the communication portion;
        execute image data acquisition by the scanner based on the read command;
        send the acquired image data to the external terminal device through the communication portion;
        issue a warning by using the at least one of the display and the audio alarm if the key of the console is operated after the scan monopoly mode is set and before the read command is received;

not issue the warning if the key of the console is operated but the scan monopoly mode is not set; and cancel the scan monopoly mode after the sending of the acquired image data is completed when detecting that the original is removed from the original tray.

10. An original reading apparatus, comprising:
a scanner configured to acquire image data by scanning an original placed thereon;
an original placement portion on which the original is placed;
an original cover configured to open and close proximate the original placement portion;
a communication portion interactively connected to an external terminal device for communication;
a console including a key and configured to allow a user to perform an input operation;
at least one of a display portion configured to display various kinds of information including a warning and an audio alarm configured to sound a warning; and
a controller configured to:
detect a state of the original cover;
determine whether an operation for setting a scan monopoly mode is performed by the user;
set the scan monopoly mode if the operation is determined;
receive a read command from the external terminal device through the communication portion;
execute image data acquisition by the scanner based on the read command;
send the acquired image data to the external terminal device through the communication portion;
issue a warning by using the at least one of the display and the audio alarm if the key of the console is operated after the scan monopoly mode is set and before the read command is received;
not issue the warning if the key of the console is operated but the scan monopoly mode is not set; and
cancel the scan monopoly mode after the sending of the acquired image data is completed.

11. The original reading apparatus according to claim 10, wherein, if the original cover is detected as open by the controller during scanning by the scanner, the controller is configured to interrupt the scanning by the scanner.

12. The original reading apparatus according to claim 11, wherein, if closure of the original cover is detected by the controller after the scanning by the scanner is interrupted, the controller restarts the scanning by the scanner.

13. The original reading apparatus according to claim 12, wherein, when the scanning by the scanner is restarted, the controller sends a notification signal that the scanning is restarted to the external terminal device from the communication portion.

14. The original reading apparatus according to claim 12, wherein, after the scanning restarts, the scanner starts the scanning from an initial scanning start position again.

15. The original reading apparatus according to claim 10, further comprising an original conveying mechanism that is provided on the original cover and that is configured to convey the original that is placed on an original tray to a position at which scanning by the scanner is possible.

16. An image forming apparatus, comprising:
a scanner configured to acquire image data by scanning an original placed thereon;
a communication portion interactively connected to an external terminal device for communication;
a console including a key and configured to allow a user to perform an input operation;
at least one of a display portion configured to display various kinds of information including a warning and an audio alarm configured to sound a warning;
a printing portion configured to print an image based on image data that is acquired by the scanner onto a recording medium; and
a controller configured to:
determine whether an operation for setting a scan monopoly mode is performed by the user;
set the scan monopoly mode if the operation is determined;
receive a read command from the external terminal device through the communication portion;
execute image data acquisition by the scanner based on the read command;
send the acquired image data to the external terminal device through the communication portion;
issue a warning by using the at least one of the display and the audio alarm if the key of the console is operated after the scan monopoly mode is set and before the read command is received;
not issue the warning if the key of the console is operated but the scan monopoly mode is not set; and
cancel the scan monopoly mode after the sending of the acquired image data is completed.

17. An image forming apparatus, comprising:
a scanner configured to acquire image data by scanning an original placed thereon;
an original conveying mechanism configured to convey the original that is placed on an original tray to a position at which scanning by the scanner is possible;
a communication portion interactively connected to an external terminal device for communication;
a console including a key and configured to allow a user to perform an input operation;
at least one of a display portion configured to display various kinds of information including a warning and an audio alarm configured to sound a warning;
a printing portion configured to print an image based on image data that is acquired by the scanner onto a recording medium; and
a controller configured to:
detect whether the original is on the original tray;
determine whether an operation for setting a scan monopoly mode is performed by the user;
set the scan monopoly mode if the operation is determined;
receive a read command from the external terminal device through the communication portion;
execute image data acquisition by the scanner based on the read command;
send the acquired image data to the external terminal device through the communication portion;
issue a warning by using the at least one of the display and the audio alarm if the key of the console is operated after the scan monopoly mode is set and before the read command is received;
not issue the warning if the key of the console is operated but the scan monopoly mode is not set; and
cancel the scan monopoly mode after the sending of the acquired image data is completed when detecting that the original is removed from the original tray.

18. An image forming apparatus, comprising:
a scanner configured to acquire image data by scanning an original placed thereon;
an original placement portion on which the original is placed;

an original cover configured to open and close at a position proximate the original placement portion;

a communication portion interactively connected to an external terminal device for communication;

a console including a key and configured to allow a user to perform an input operation;

at least one of a display portion configured to display various kinds of information including a warning and an audio alarm configured to sound a warning;

a printing portion configured to print an image based on image data that is acquired by the scanner onto a recording medium; and a controller configured to:
  detect a state of the original cover;
  determine whether an operation for setting a scan monopoly mode is performed by the user;
  set the scan monopoly mode if the operation is determined;
  receive a read command from the external terminal device through the communication portion;
  execute image data acquisition by the scanner based on the read command;
  send the acquired image data to the external terminal device through the communication portion;
  issue a warning by using the at least one of the display and the audio alarm if the key of the console is operated after the scan monopoly mode is set and before the read command is received;
  not issue the warning if the key of the console is operated but the scan monopoly mode is not set; and
  cancel the scan monopoly mode after the sending of the acquired image data is completed.

19. An original reading system comprising an original reading apparatus and an external terminal device that are connected to each other through a communication line, wherein, the original reading apparatus comprises:

a scanner configured to acquire image data by scanning an original placed thereon;

a communication portion interactively connected to the external terminal device for communication;

a console including a key and configured to allow a user to perform an input operation;

at least one of a display portion configured to display various kinds of information including a warning and an audio alarm configured to sound a warning; and a controller configured to:
  determine whether an operation for setting a scan monopoly mode is performed by the user;
  set the scan monopoly mode if the operation is determined;
receive a read command from the external terminal device through the communication portion;
  execute image data acquisition by the scanner based on the read command;
  send the acquired image data to the external terminal device through the communication portion;
  issue a warning by using the at least one of the display and the audio alarm if the key of the console is operated after the scan monopoly mode is set and before the read command is received;
  not issue the warning if the key of the console is operated but the scan monopoly mode is not set; and
  cancel the scan monopoly mode after the sending of the acquired image data is completed;

wherein the external terminal device comprises:
  a terminal side communication portion that is connected to the communication line; and
  a command input portion that inputs the read command.

20. An original reading system comprising an original reading apparatus and an external terminal device that are connected to each other through a communication line, wherein, the original reading apparatus comprises:

a scanner configured to acquire image data by scanning an original placed thereon;

an original conveying mechanism configured to convey the original that is placed on an original tray to a position at which scanning by the scanner is possible;

a communication portion interactively connected to an external terminal device for communication;

a console including a key and configured to allow a user to perform an input operation;

at least one of a display portion configured to display various kinds of information including a warning and an audio alarm configured to sound a warning; and a controller configured to:
  detect whether the original is on the original tray;
  determine whether an operation for setting a scan monopoly mode is performed by the user;
  set the scan monopoly mode if the operation is determined;
  receive a read command from the external terminal device through the communication portion;
  execute image data acquisition by the scanner based on the read command; and
  send the acquired image data to the external terminal device through the communication portion;
  issue a warning by using the at least one of the display and the audio alarm if the key of the console is operated after the scan monopoly mode is set and before the read command is received;
  not issue the warning if the key of the console is operated but the scan monopoly mode is not set; and
  cancel the scan monopoly mode after the sending of the acquired image data is completed when detecting that the original is removed from the original tray, wherein external the terminal device comprises:
  a terminal side communication portion that is connected to the communication line; and
  a command input portion that inputs the read command.

21. An original reading system comprising:
an original reading apparatus and an external terminal device that are communicably connected to each other, wherein the original reading apparatus includes:

a scanner configured to acquire image data by scanning an original placed thereon;

an original placement portion on which the original is placed;

an original cover configured to open and close proximate the original placement portion;

a communication portion interactively connected to the external terminal device for communication;

a console including a key and configured to allow a user to perform an input operation;

at least one of a display portion configured to display various kinds of information including a warning and an audio alarm configured to sound a warning; and a controller configured to:
  detect a state of the original cover;
  determine whether an operation for setting a scan monopoly mode is performed by the user;

set the scan monopoly mode if the operation is determined;
receive a read command from the external terminal device through the communication portion;
execute image data acquisition by the scanner based on the read command;
send the acquired image data to the external terminal device through the communication portion;
issue a warning by using the at least one of the display and the audio alarm if the key of the console is operated after the scan monopoly mode is set and before the read command is received;
not issue the warning if the key of the console is operated but the scan monopoly mode is not set; and
cancel the scan monopoly mode after the sending of the acquired image data is completed,
wherein the external terminal device comprises:
a terminal side communication portion that is connected to the communication line; and
a command input portion configured to input the read command.

* * * * *